PORTABLE RADIO RECEIVER

Filed March 26, 1954

Inventors,
Jack Briskin.
Carl W. Claros.
By. Zabel, Baker, York, Jones & Dithmar
Attorneys.

United States Patent Office 2,810,069

Patented Oct. 15, 1957

2,810,069

PORTABLE RADIO RECEIVER

Jack Briskin and Carl W. Claras, Chicago, Ill., assignors to Revere Camera Company, Chicago, Ill., a corporation of Delaware Application March 26, 1954, Serial No. 418,938

3 Claims. (Cl. 250—14)

This invention relates to a portable radio receiver, and more particularly to a portable A. C.-D. C.-battery operated radio receiver provided with a carrying case and an associated shoulder or carrying strap.

Portable radio receiver of the A. C.-D. C.-battery operated type have a power cord of substantial length for use when the receiver is operated from an A. C. or D. C. utility power source. When such a receiver is battery operated, the power cord is, of course, not employed. In most prior receivers of this character a suitable storage compartment is provided to house the power cord when not in use, this storage compartment adding to the size of the receiver which desirably should be as small as possible.

Further, portable radio receivers of this character have a power interlock switch which in one switch position functions to apply power from a utility power source and which in an alternative switch position conditions the receiver for battery operation. In most instances the interlock switch is actuated by cooperation between the utility plug of the power cord and a receptacle which forms a part of the switch.

One object of this invention is to provide a portable A. C.-D. C.-battery operated radio receiver which is so constructed that a storage compartment for housing the power cord is rendered unnecessary, thereby enabling the receiver to be made smaller in size by an amount usually required for the compartment. This, of course, is an important factor in the design of a portable receiver.

Another object of the invention is to provide a portable A. C.-D. C.-battery operated radio receiver wherein the power cord is permanently housed within a functional part of the receiver, namely, the shoulder or carrying strap.

Another object is to provide a shoulder strap for a portable radio receiver in which the power cord of the receiver is self-contained, the power cord emerging from the strap near one strap end and being provided with a usual power plug. The shoulder strap has a member which functions to cover and uncover the power plug depending on whether use of the plug is necessary.

Another object is to provide a portable A. C.-D. C.-battery operated radio receiver which is provided with a shoulder strap, the shoulder strap having one end fixed more or less permanently to the receiver. The other end is detachably connected to the receiver by means of a clasp arrangement. This strap end is attached to the receiver when the shoulder strap is in use or when it is desired to operate the receiver by battery. It is detached from the receiver when the power cord is used to operate the receiver from a utility power source.

Still another object of the invention is to provide a clasp arrangement for the detachable shoulder strap end which includes an element, operable when the clasp arrangement is closed, to actuate a power interlock switch to condition the receiver for battery operation.

Other objects, advantages and details of the invention will be apparent as the description proceeds, reference being had to the accompanying drawing which illustrates one embodiment of the invention. It is to be understood, however, that the description and drawing are exemplary only, and that the scope of the invention is to be measured by the appended claims.

In the drawing:

Fig. 1 is a perspective view of a portable A. C.-D. C.-battery operated radio receiver embodying the invention;

Figures 1, 2, 3, 4:
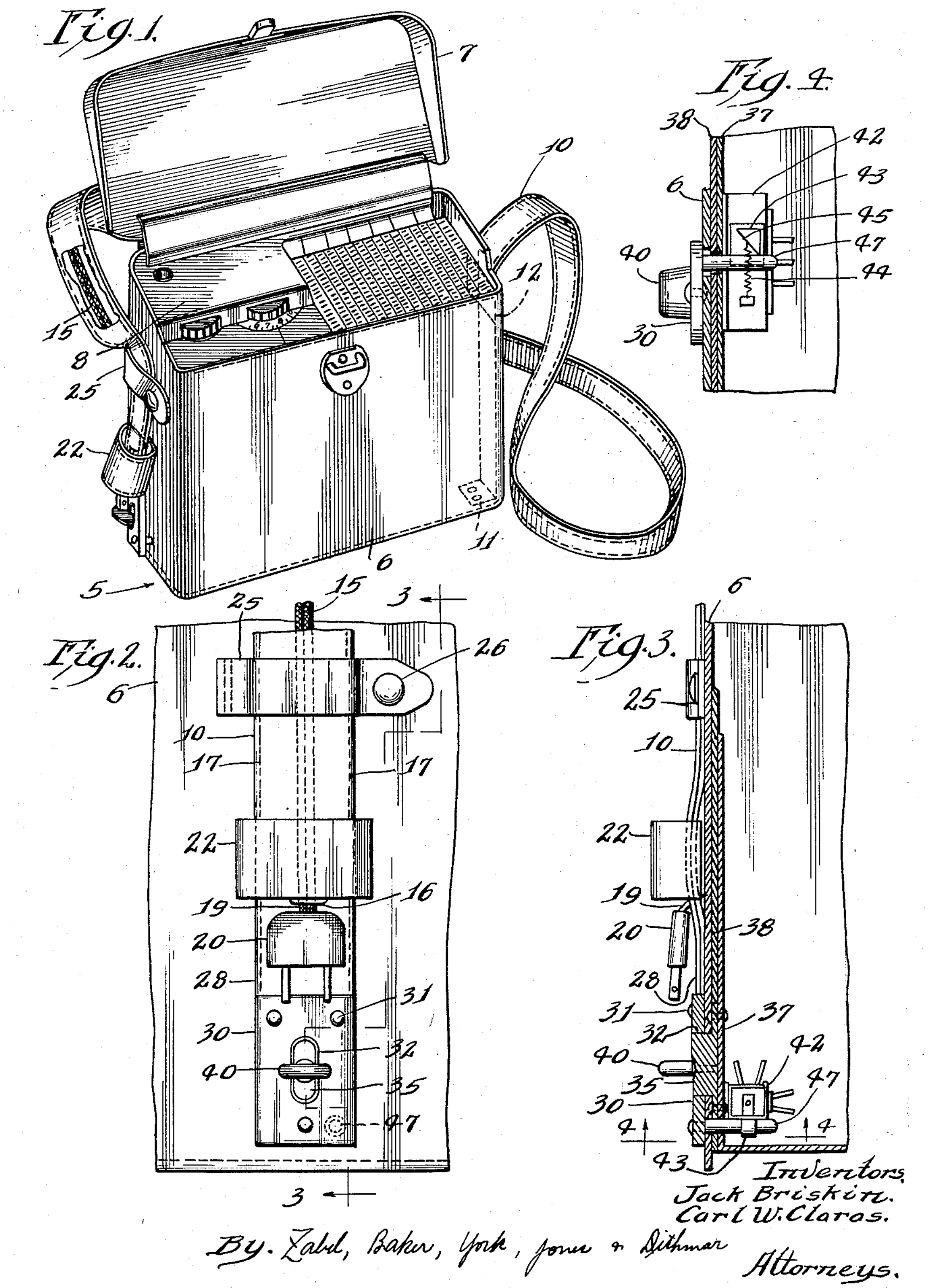
Fig. 2 is a fragmentary front elevational view of one side of the receiver illustrating certain details of the invention.
Fig. 3 is a side elevational view, partly in section, of the details shown in Fig. 2.
Fig. 4 is a sectional view on line 4—4 of Fig. 3.

Referring now to the drawing, the invention is shown embodied in a portable A. C.-D. C.-battery operated radio receiver designated generally by 5. Receiver 5 includes a carrying case 6 made of any suitable material, preferably leather. Case 6 desirably has a hinged cover 7 which encloses an operating panel 8.

Carrying case 6 is provided with a shoulder strap 10 of suitable length to pass over a shoulder and support the receiver at a convenient carrying height. One end, namely end 11, of strap 10 is fixed more or less permanently to the receiver chassis contained within case 6. A detachable cross strap 12 may be provided near the top of case 6 to overlie strap 10 above end 11 and establish a proper relationship between the strap and the carrying case.

Strap 10 is of such construction that it houses a power cord 15 (Fig. 2) which extends from the receiver chassis (not shown in detail) into fixed strap end 11 and longitudinally through the strap to and through an exit opening 16 located near the other end of the strap. Shoulder strap 10 may be of molded plastic construction with cord 15 molded therein, but preferably it is of multi-ply construction made up of two or more layers of sheet material such as leather stitched together along horizontal edges as shown at 17. End 19 of cord 15 which emerges through exit opening 16 is provided with a conventional power plug 20 for use in a convenience outlet when the receiver is to be operated from a utility power source.

Means are provided to cover and uncover power plug 20 depending on whether use of the plug is necessary. In the form of the invention shown, an endless strap 22 or the like surrounds shoulder strap 10. It is adapted to slide longitudinally of the strap 10 to cover and uncover plug 20.

A cross strap 25 (Fig. 2) attached to the upper portion of the side of case 6 which receives the detachable end of strap 10 overlies strap 10. One end of cross strap 25 is provided with a snap fastener 26 or the like so that the associated end of shoulder strap 10 may be freed from the case when power cord 15 is used.

Plug carrying end 28 of shoulder strap 10 carries a first portion 30 of a detachable clasp. As here illustrated, portion 30 is a metal plate which is suitably attached to strap end 28 as by rivets 31. Plate 30 has a central opening 32 as shown in Fig. 2.

A second portion 35 of the detachable clasp is mounted on the receiver in fixed relation with case 6. While possible to mount second portion 35 directly on case 6, it is preferred to mount the portion on receiver chassis 37 as shown in Fig. 3. As further shown in Fig. 3, chassis 37 is received within a framework 38 which forms a part of case 6. Since chassis 37, framework 38 and case 6 all are more or less fixed with respect to each other, it will be seen that second portion 35 of the detachable clasp when mounted on chassis 37 has a fixed relation with case 6.

Second clasp portion 35 includes a boss which when the clasp is assembled protrudes through opening 32 in clasp portion 30 as shown in Figs. 2 and 3. A rotatable keeper 40 is mounted on the boss to function in conventional manner.

A power interlock switch 42 is mounted on chassis 37 adjacent second clasp portion 35. Switch 42 may be a conventional two-position switch having an actuating member 43 and a spring 44 (Fig. 4) which biases member 43 toward one of the switch positions. Actuating member 43 is moved to its alternative switch position and held in such position through engagement, as will be seen, by an element forming part of first portion 30 of the detachable clasp.

First clasp portion 30 has a projection or prong 47 which, when the two clasp portions are assembled, extends through aligned openings in case 6, framework 38 and chassis 37 into operative relation with switch actuating member 43. When projection or prong 47 is passed through the aforesaid aligned openings it engages an inclined cam surface 45 on actuating member 43, and continued insertion of the prong causes member 43 to move from the switch position established by bias spring 44 to the alternative switch position, the switch being so connected in the circuit that the latter position conditions the receiver for battery operation while the former provides operation from a utility power source.

Thus it will be seen that the foregoing arrangement eliminates the need for a separate storage compartment for the power cord of an A. C.-D. C.-battery operated radio receiver. In addition, suitable accommodation has been made for concealing the power plug when the receiver is operated by battery. Also, the arrangement incorporates a power interlock switch and provides more or less automatic means for actuating the switch depending on whether the receiver is to be operated by battery or from a utility power source.

From the above description it is thought that the construction and advantages of the invention will be readily apparent to those skilled in the art. Various changes in detail may be made without departing from the spirit or losing the advantages of the invention.

Having thus described our invention, what we claim as new and desire to secure by Letters Patent is:

1. In a portable external power supply battery operated radio receiver, a carrying case for a receiver chassis, a shoulder strap for said case, one end of said strap being secured with respect to said case, a power cord from said chassis extending from said secured strap end longitudinally through said strap to the other end where it emerges through an exit opening, a power plug on said cord immediately beyond said opening, a first portion of a detachable clasp carried at said other strap end, a second clasp portion mounted on said receiver chassis, a power interlock switch mounted on said chassis adjacent said second clasp portion, said first clasp portion including means for actuating said switch when the two clasp portions are assembled, said power plug and said first clasp portion being disposed adjacent a side of said case when said clasp portions are assembled.

2. In a portable external power supply battery operated radio receiver, a carrying case for a receiver chassis, a shoulder strap having one end secured with respect to said case, said shoulder strap being of multi-ply construction, a power cord from said chassis extending from the secured strap end longitudinally of said strap between two plies thereof to and through an exit opening near the other end of said strap, a power plug on said cord beyond said exit opening, a first portion of a detachable clasp carried at said other strap end, a second portion of the detachable clasp mounted in fixed relation with said case, said power plug and said first clasp portion being disposed adjacent a side of said case when said clasp portions are assembled, and a power interlock switch mounted on the chassis adjacent said second detachable clasp portion, said switch including an actuating member, and a projection carried by said first detachable clasp portion and adapted to engage said actuating member to move it to an alternative switch position when the two clasp portions are assembled.

3. The combination of claim 2 wherein said projection comprises a prong which extends through openings in said case and chassis to engage said switch actuating member.

References Cited in the file of this patent

UNITED STATES PATENTS

| | | |
|---|---|---|
| 2,229,729 | Emde | Jan. 28, 1941 |
| 2,487,509 | Baker | Nov. 8, 1949 |
| 2,571,514 | Andrews | Oct. 16, 1951 |